US012684204B2

(12) United States Patent
Hannan et al.

(10) Patent No.: US 12,684,204 B2
(45) Date of Patent: Jul. 14, 2026

(54) SYSTEMS AND METHODS FOR AUTOMATING VIDEO REFORMATTING

(71) Applicant: Meta Platforms, Inc., Menlo Park, CA (US)

(72) Inventors: Matthew Hannan, Austin, TX (US); Stephen Crowley, Seattle, WA (US); William B Harding, Katonah, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 296 days.

(21) Appl. No.: 18/521,815

(22) Filed: Nov. 28, 2023

(65) Prior Publication Data

US 2024/0179380 A1 May 30, 2024

Related U.S. Application Data

(60) Provisional application No. 63/385,157, filed on Nov. 28, 2022.

(51) Int. Cl.
| | |
|---|---|
| *H04N 21/845* | (2011.01) |
| *G06T 7/70* | (2017.01) |
| *G06V 40/16* | (2022.01) |
| *H04N 21/2343* | (2011.01) |

(52) U.S. Cl.
CPC .......... *H04N 21/8456* (2013.01); *G06T 7/70* (2017.01); *G06V 40/161* (2022.01); *H04N 21/234372* (2013.01); *G06T 2207/20132* (2013.01)

(58) Field of Classification Search
CPC ........ H04N 21/8456; H04N 21/234372; G06T 7/70; G06T 2207/20132; G06T 2207/10016; G06V 40/161
See application file for complete search history.

(56) References Cited

U.S. PATENT DOCUMENTS

| | | | | |
|---|---|---|---|---|
| 2011/0119715 | A1* | 5/2011 | Chang .............. | H04N 21/41265 704/275 |
| 2014/0152832 | A1* | 6/2014 | Goldfeder .............. | H04N 7/181 348/157 |
| 2020/0104601 | A1* | 4/2020 | Karoui ............... | H04N 23/6811 |
| 2020/0304754 | A1* | 9/2020 | Huynh Thien ....... | G11B 27/031 |
| 2023/0140369 | A1* | 5/2023 | Aminian ............... | G06F 16/739 382/103 |
| 2023/0419505 | A1* | 12/2023 | Tang ...................... | H04N 23/73 |

* cited by examiner

*Primary Examiner* — Chenea Davis
(74) *Attorney, Agent, or Firm* — EVERSHEDS SUTHERLAND (US) LLP

(57) ABSTRACT

The disclosed computer-implemented method may include detecting, by a computing device, a command to clip a video segment from a video stream. The method may also include extracting, by the computing device, the video segment from the video stream based on the command. Additionally, the method may include automatically identifying, by the computing device, one or more points of interest in the video segment. Furthermore, the method may include determining, by the computing device, one or more sets of coordinates to crop the video segment based on a predetermined aspect ratio and the one or more points of interest. Finally, the method may include creating, by the computing device, a short-form video by cropping and reformatting the video segment based on the one or more sets of coordinates. Various other methods, systems, and computer-readable media are also disclosed.

19 Claims, 9 Drawing Sheets

Method
100

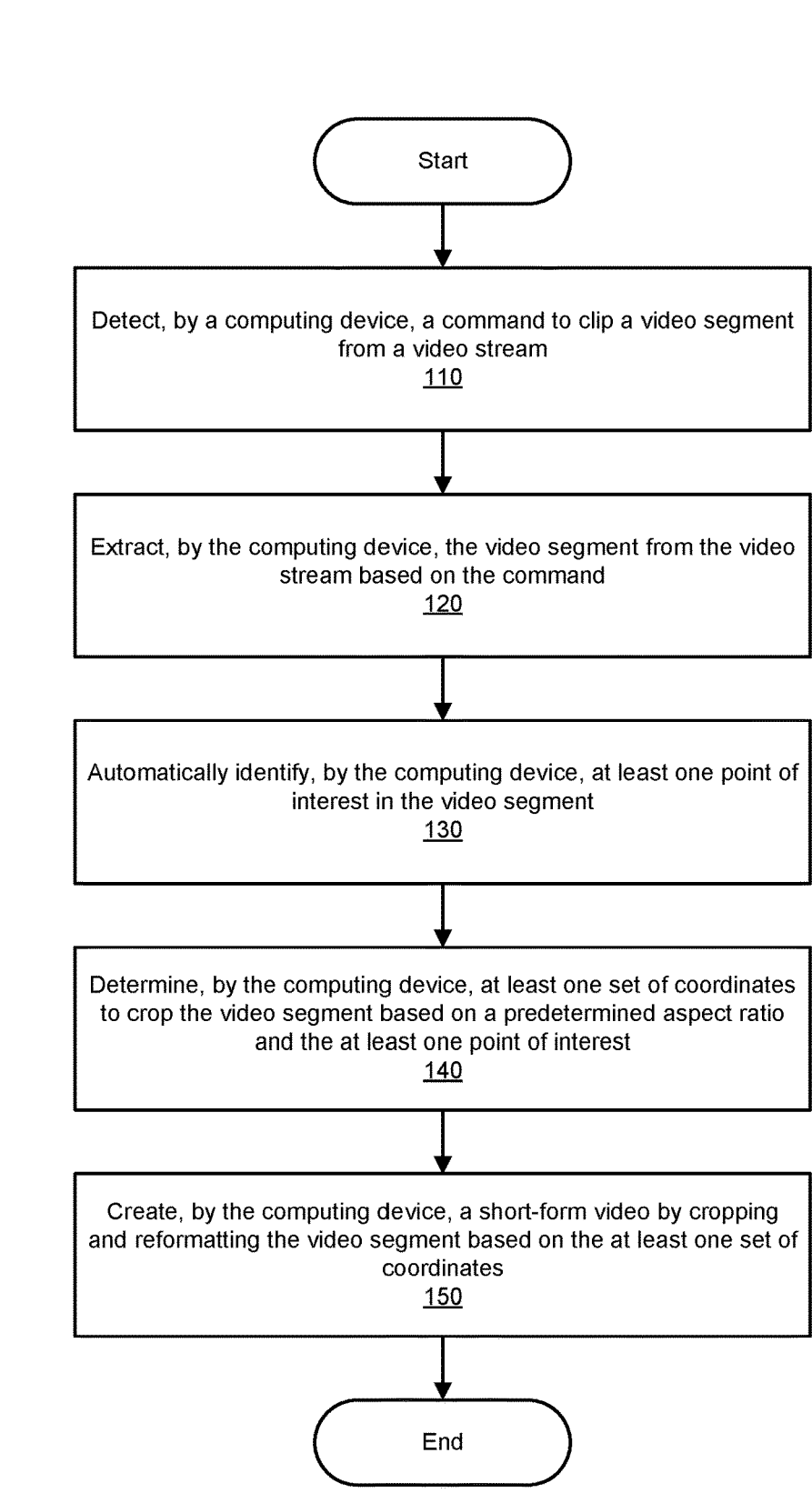

Start

Detect, by a computing device, a command to clip a video segment
from a video stream
110

Extract, by the computing device, the video segment from the video
stream based on the command
120

Automatically identify, by the computing device, at least one point of
interest in the video segment
130

Determine, by the computing device, at least one set of coordinates
to crop the video segment based on a predetermined aspect ratio
and the at least one point of interest
140

Create, by the computing device, a short-form video by cropping
and reformatting the video segment based on the at least one set of
coordinates
150

End

*FIG. 1*

SYSTEMS AND METHODS FOR AUTOMATING VIDEO REFORMATTING

CROSS REFERENCE TO RELATED APPLICATION

This application claims the benefit of U.S. Provisional Application No. 63/385,157, filed 28 Nov. 2022, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 1 is a flow diagram of an exemplary method for automating video reformatting.

Figure 2:
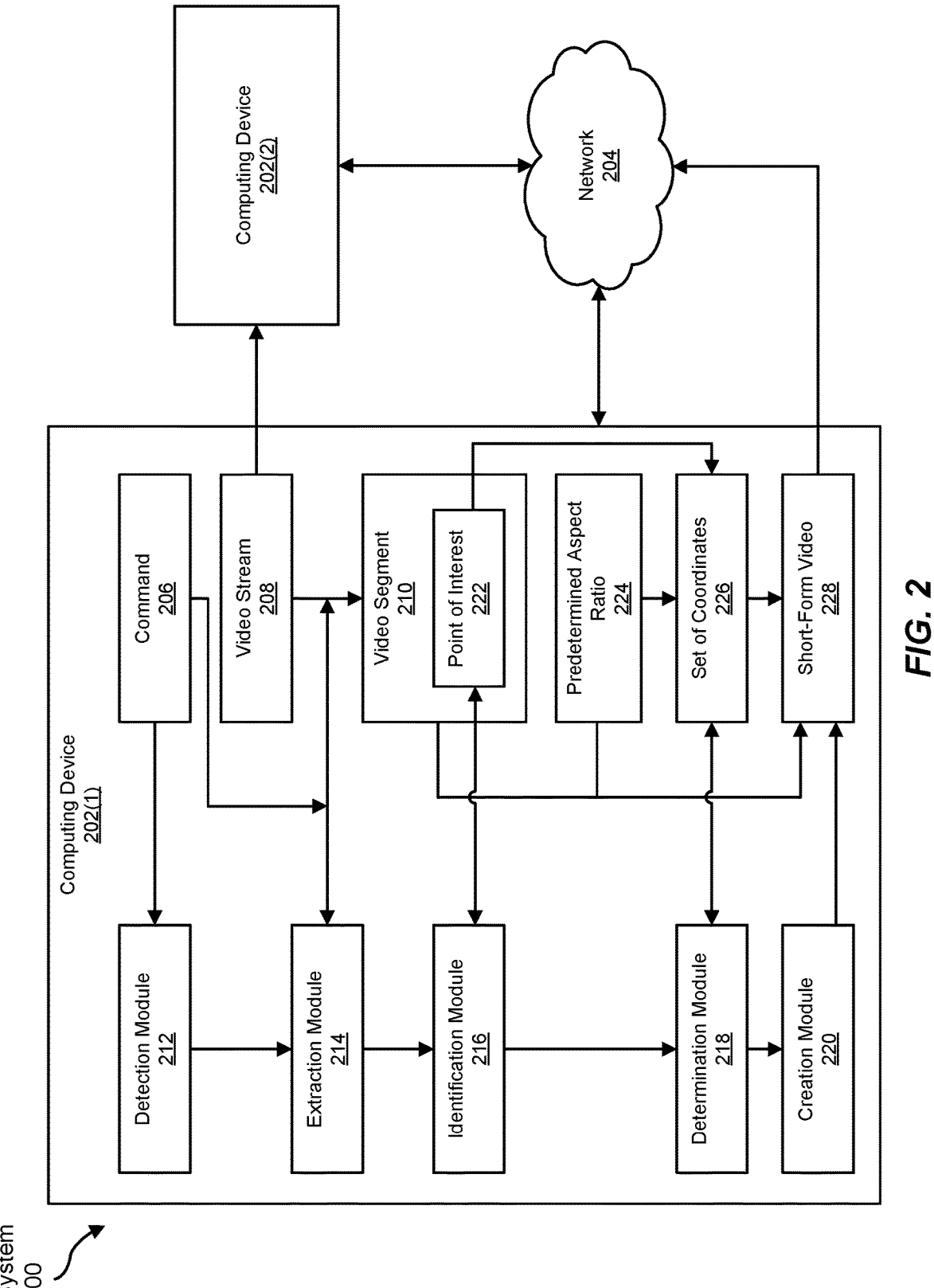
FIG. 2 is a block diagram of an exemplary system for automating video reformatting.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Video streaming enables users to share video of activities such as gaming to an online audience. For example, a user playing a video game may stream real-time, live gameplay during a gaming session for online viewers. Additionally, the user may include other effects, such as a facecam that records the user's reactions and comments during the gaming session. In this example, the video may be streamed in a landscape format, such as a 16:9 aspect ratio, in accordance with the format of the video game. However, in some situations, users may want to share a clip of the live streaming session for easier consumption by viewers. For example, a user may want to clip an interesting portion of gameplay as a highlight to be shared with viewers on mobile devices. In these situations, the original video format may be unwieldy for a mobile device, which may be generally used in a portrait format, such as a 9:16 aspect ratio. To adjust to different aspect ratios, users may need to reformat the original streamed video for ease of sharing.

However, converting a video to a new aspect ratio or a new format may be a difficult process. Traditional computing systems may require users to manually perform many of the steps of reformatting a video. For example, a user may need to manually edit the length of a selected video to highlight a particular moment, transform the edited video to a new aspect ratio, and then create the new video as a sharable clip. Additionally, if there are multiple areas of the video that are interesting to view, the user may need to decide on just one area or find ways to clip multiple segments and combine them. This process may be time-consuming and cumbersome, and it may require additional specialized software applications to properly create the highlight reels. Other methods to reformat an entire clip may create clips that are less interesting and, therefore, less engaging for viewers. Thus, better methods of automating video reformatting are needed to avoid the costly process of manual reformatting while maintaining engagement.

The present disclosure is generally directed to systems and methods for automating video reformatting. As will be explained in greater detail below, embodiments of the present disclosure may, by automatically identifying points of interest within a video, automate the clipping of the video to generate a new, reformatted video. By analyzing a video stream using machine-learning methods, the systems and methods described herein may first identify specific points of interest that a user may want to highlight. For example, the disclosed systems and methods may identify an interesting moment of gameplay during a live-streamed gaming session. Additionally, the disclosed systems and methods may use a machine-learning model such as a face-tracking model to identify a portion of the video showing a facecam of the user. The disclosed systems and methods may then separately clip each point of interest and combine them into a new video with a target aspect ratio. For example, the disclosed systems and methods may crop the interesting gameplay to fit the target aspect ratio and then overlap the facecam portion in a corner of the new video clip. The systems and methods disclosed herein may save the new video in a desired format, aspect ratio, and/or file type.

By automatically detecting a voice command to clip a moment from a video stream, the disclosed systems and methods may also enable hands-free clipping without manual user input. For example, the systems and methods described herein may enable users to set specific command words or phrases and, subsequently, detect when a command has been spoken. As another example, the systems and methods described herein may automate the detection of interesting moments during a video stream to automate clipping the video. Furthermore, after reformatting the clipped video segment, the disclosed systems and methods may create a sharable video. The systems and methods described herein may then enable a user to edit the reformatted video before sharing it. Finally, the disclose systems and methods may share the new, short-form video to a network or on a social media platform.

In addition, the systems and methods described herein may improve the functioning of a computing device by improving the automation of video clipping and reformatting to reduce manual input and enable hands-free video sharing. These systems and methods may also improve the fields of video editing and video streaming by improving the automated detection of points of interest within videos using machine learning. Thus, the disclosed systems and methods may improve over traditional methods of video reformatting.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of computer-implemented methods for automating video reformatting. Detailed descriptions of corresponding exemplary systems will be provided in connection with FIGS. 2-3. Detailed descriptions of an exemplary detection of an exemplary command will be provided in connection with FIG. 4. In addition, detailed descriptions of an exemplary timeline of an exemplary video stream will be provided in connection with FIG. 5. Furthermore, detailed descriptions of an exemplary machine-learning model for identifying exemplary points of interest and sets of coordinates will be provided in connection with FIG. 6. Detailed descriptions of an exemplary cropping of exemplary points of interest will be provided in connection with FIG. 7. Finally, detailed descriptions of exemplary overlays for exemplary reformatted video segments will be provided in connection with FIGS. 8-9.

FIG. 1 is a flow diagram of an exemplary computer-implemented method 100 for automating video reformatting. The steps shown in FIG. 1 may be performed by any suitable computer-executable code and/or computing system, including the systems illustrated in FIGS. 2-3. In one example, each of the steps shown in FIG. 1 may represent an algorithm whose structure includes and/or is represented by multiple sub-steps, examples of which will be provided in greater detail below.

Figure 3:
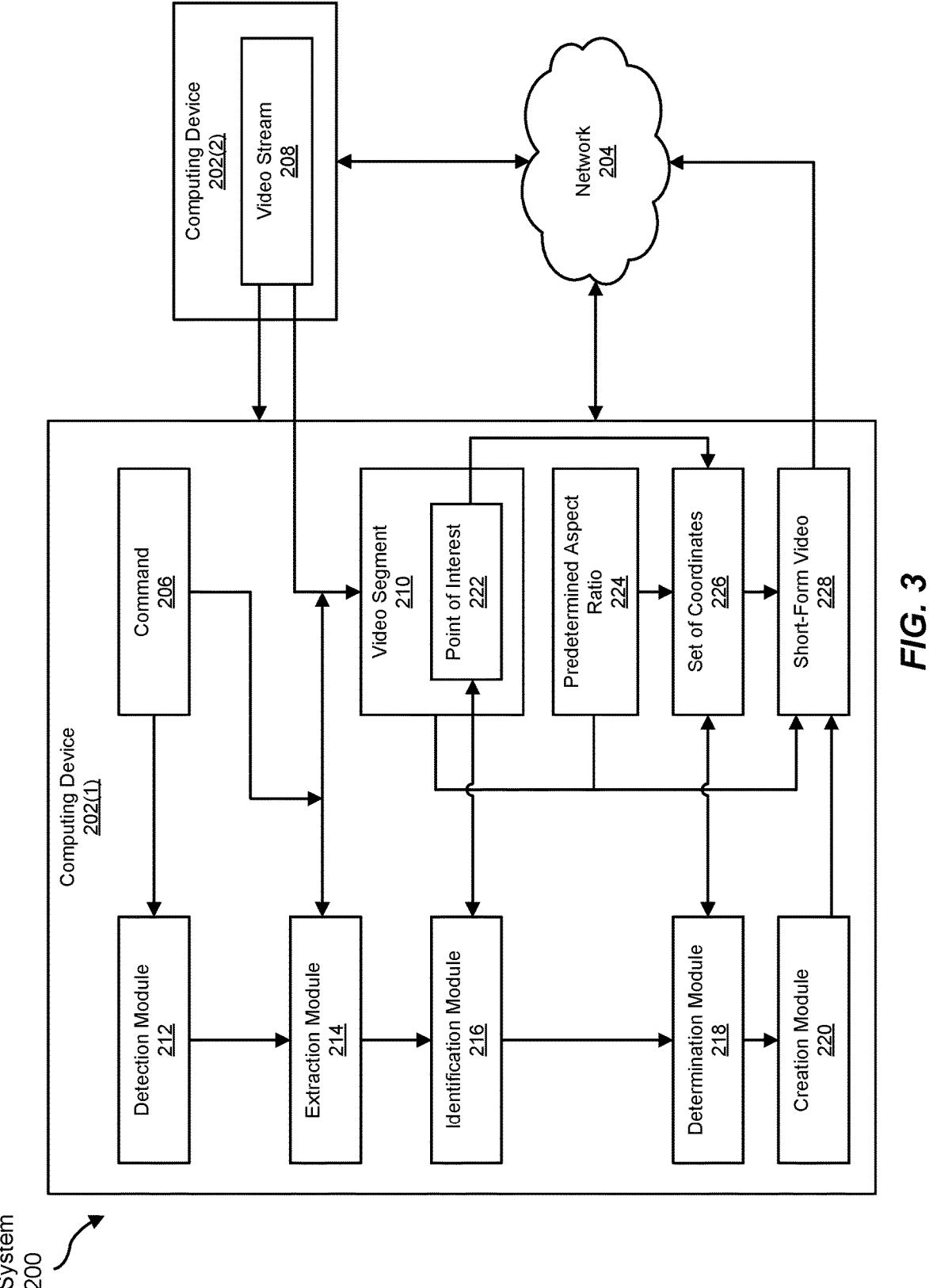
FIG. 3 is a block diagram of a different exemplary system for automating video reformatting.

As illustrated in FIG. 1, at step 110 one or more of the systems described herein may detect, by a computing device, a command to clip a video segment from a video stream. For example, FIG. 2 is a block diagram of an exemplary system 200 for automating video reformatting. As illustrated in FIG. 2, a detection module 212 may, as part of a computing device 202(1), detect a command 206 to clip a video segment 210 from a video stream 208.

The systems described herein may perform step 110 in a variety of ways. In one example, computing devices 202 (1)-(2) of FIGS. 2-3 may generally represent any type or form of computing device or server that may be programmed with the modules of FIGS. 2-3 and/or may store all or a portion of the data described herein. For example, computing device 202(1) and/or computing device 202(2) may represent client devices that are capable of streaming or viewing videos and/or accessing online platforms. In this example, computing device 202(1) and/or computing device 202(2) may be programmed with the modules of FIGS. 2-3 to create short-form videos and may be capable of reading computer-executable instructions. As another example, computing device 202(2) may represent a server or online platform, such as a social media platform, that is capable of receiving, hosting, and/or broadcasting videos, such as video stream 208, for other computing devices. Examples of computing devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additional examples of computing devices may include, without limitation, application servers and database servers configured to provide various database services and/or run certain software applications, such as communication and data transmission services.

Furthermore, in some embodiments, computing devices 202(1)-(2) may be in communication with each other or with other computing devices and systems via a wireless or wired network, such as a network 204. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

In some examples, the term "video stream" may refer to multimedia content that is provided for playback through a continuous stream of data transmission. For example, video stream 208 may represent a livestreaming video that is captured and transmitted over network 204 in real time. As another example, video stream 208 of FIG. 3 may be a pre-recorded video that is then posted on an online platform, and computing device 202(1) may stream video stream 208 through the online platform. In some embodiments, such as the example of FIG. 2, video stream 208 may include a video broadcast by computing device 202(1) to one or more other computing devices, such as computing device 202(2). In this example, a user of computing device 202(1) may represent a content creator live streaming a gaming session as video stream 208 who wants to create a highlight reel of a moment during the gaming session. Additionally or alternatively, as in the example of FIG. 3, video stream 208 may include a video received by computing device 202(1) from another computing device, such as computing device 202(2). In this example, a user of computing device 202(1) may represent a viewer watching video stream 208 on a social media platform who wants to clip and share content while watching video stream 208. In these examples, computing device 202(1) may send or receive video stream 208 over network 204 and/or any other suitable connection to another computing device.

In one embodiment, detection module 212 may detect command 206 by predicting command 206 based on a machine-learning analysis of video stream 208. In some examples, the term "machine learning" may refer to a computational algorithm that may learn from data in order to make predictions. In these examples, the term "machine-learning model" may refer to a model that performs machine learning to learn from input data and make predictions. Examples of machine learning models may include, without limitation, support vector machines, neural networks, clustering models, decision trees, regression analysis models, classifiers, variations or combinations of one or more of the same, and/or any other suitable model using supervised, semi-supervised, or unsupervised learning.

For example, detection module 212 may intelligently detect a specific gameplay moment or an instance in a livestream or long-form video that may be important for a user to display. In this example, detection module 212 may completely automate the detection of the interesting moment and execute command 206 to clip video segment 210 from video stream 208 to include the interesting moment. In this example, a user of computing device 202(1) may opt into automated detection of interesting moments to automate the clipping of video segments during video stream 208. For example, detection module 212 may use machine learning to detect images in video stream 208 that indicate important moments based on previous short-form videos shared by the user and, subsequently, may clip and reformat video segments containing each of these moments. In this example, each clipped video segment may include a video length based on how long the moment lasts and/or may include a preset clip length, such as a clip length set by the user or the sharing platform.

Additionally or alternatively, detection module 212 may detect command 206 by detecting a user command. In this embodiment, the user command may include a manual input from the user, such as a mouse click to select a menu option. Alternatively, detecting the user command may include detecting a voice command by a user and using natural language processing to extract the command from the voice command. In some examples, the term "natural language processing" may refer to a machine learning or artificial intelligence method that interprets human language. In this embodiment, detection module 212 may detect the voice command from a microphone of computing device 202(1), such as a viewer of video stream 208 commanding computing device 202(1) in FIG. 3 to clip video segment 210. Alternatively, detection module 212 of FIG. 2 may detect the voice command by analyzing speech from the audio of video stream 208.

Figure 4:
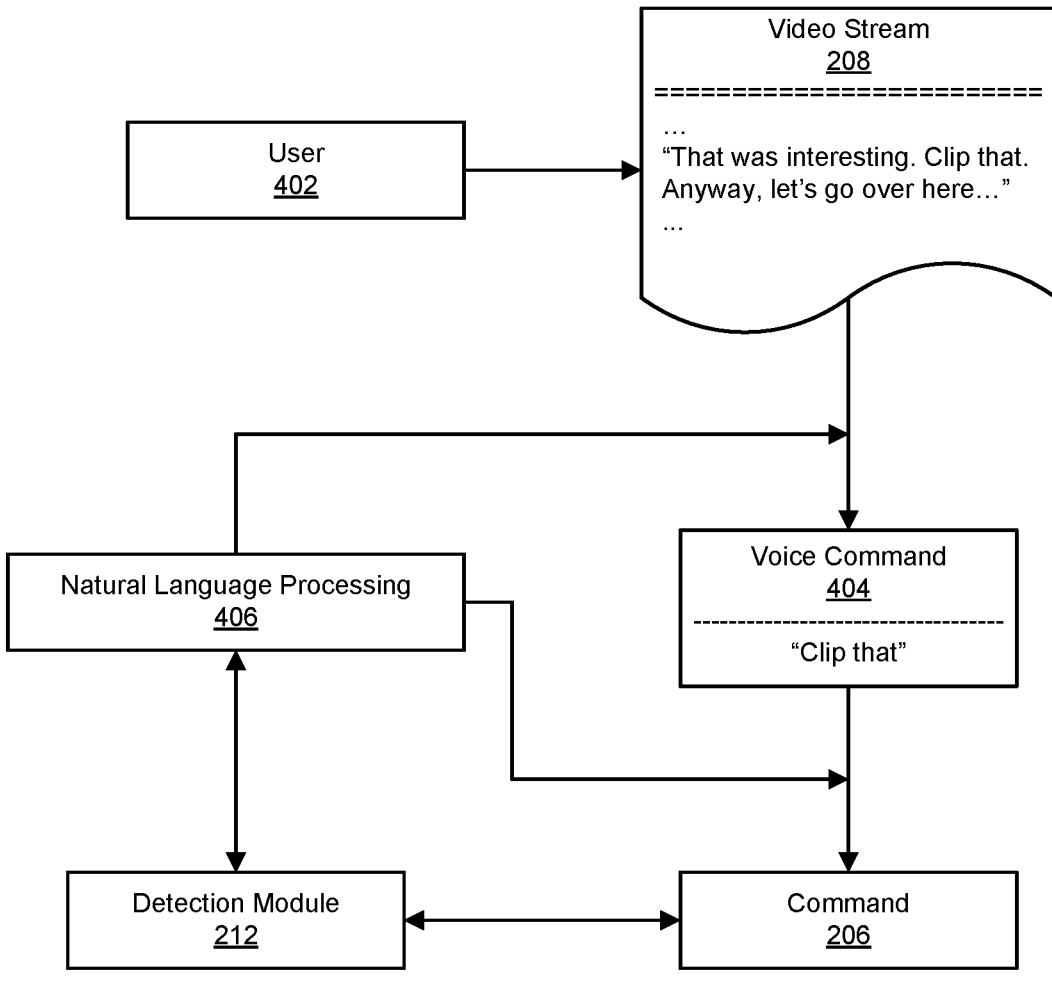
FIG. 4 is a block diagram of an exemplary detection of an exemplary command.

As shown in the example of FIG. 4, video stream 208 may include audio that includes speech by a user streaming video stream 208. In this example, a user 402 may define a phrase (e.g., "clip that") as a voice command 404. In this example, detection module 212 may monitor the audio of video stream 208 and then use natural language processing 406 to extract and transcribe voice command 404. Additionally, detection module 212 may use natural language processing 406 to identify and parse the words of voice command 404 and determine that they correspond to command 206 to clip video segment 210. In these examples, user 402 may specify and define words or phrases that execute specific commands. In these examples, these words or phrases may correspond to additional commands, such as a command to present a user interface element, a command to begin and/or end the streaming session, a command to insert a visual and/or audio effect into video stream 208, and/or other commands for computing device 202(1).

In additional embodiments, user 402 may represent a viewer of video stream 208 and may give command 206 based on a request from a user broadcasting video stream 208. Additionally or alternatively, command 206 may trigger computing device 202(1) of FIG. 3 to clip video segment 210 based on detecting command 206 originally spoken as voice command 404 during video stream 208 by the user broadcasting video stream 208.

Returning to FIG. 1, at step 120, one or more of the systems described herein may extract, by the computing device, the video segment from the video stream based on the command. For example, an extraction module 214 may, as part of computing device 202(1) of FIGS. 2-3, extract video segment 210 from video stream 208 based on command 206.

The systems described herein may perform step 120 in a variety of ways. In some examples, extraction module 214 may extract video segment 210 from video stream 208 by extracting a preset clip length of video stream 208 from a time prior to a timestamp of command 206 to the timestamp of command 206. For example, computing device 202(1) may take a timestamp when command 206 is given, send the timestamp to a clipping application programming interface (API), and the clipping API may extract a length of video from before the timestamp until the timestamp. In these examples, a user may select a length of time to clip short-form videos. For example, the user may determine the preset clip length based on a length of time that encourages viewer engagement with the video. As another example, short-form videos may be limited by settings of an online platform for posting such videos, and the preset clip length may optionally include 30 seconds or 60 seconds of video. Alternatively, computing device 202(1) may determine the clip length based on the detection of an interesting moment in video stream 208 to capture the entire moment.

Figure 5:
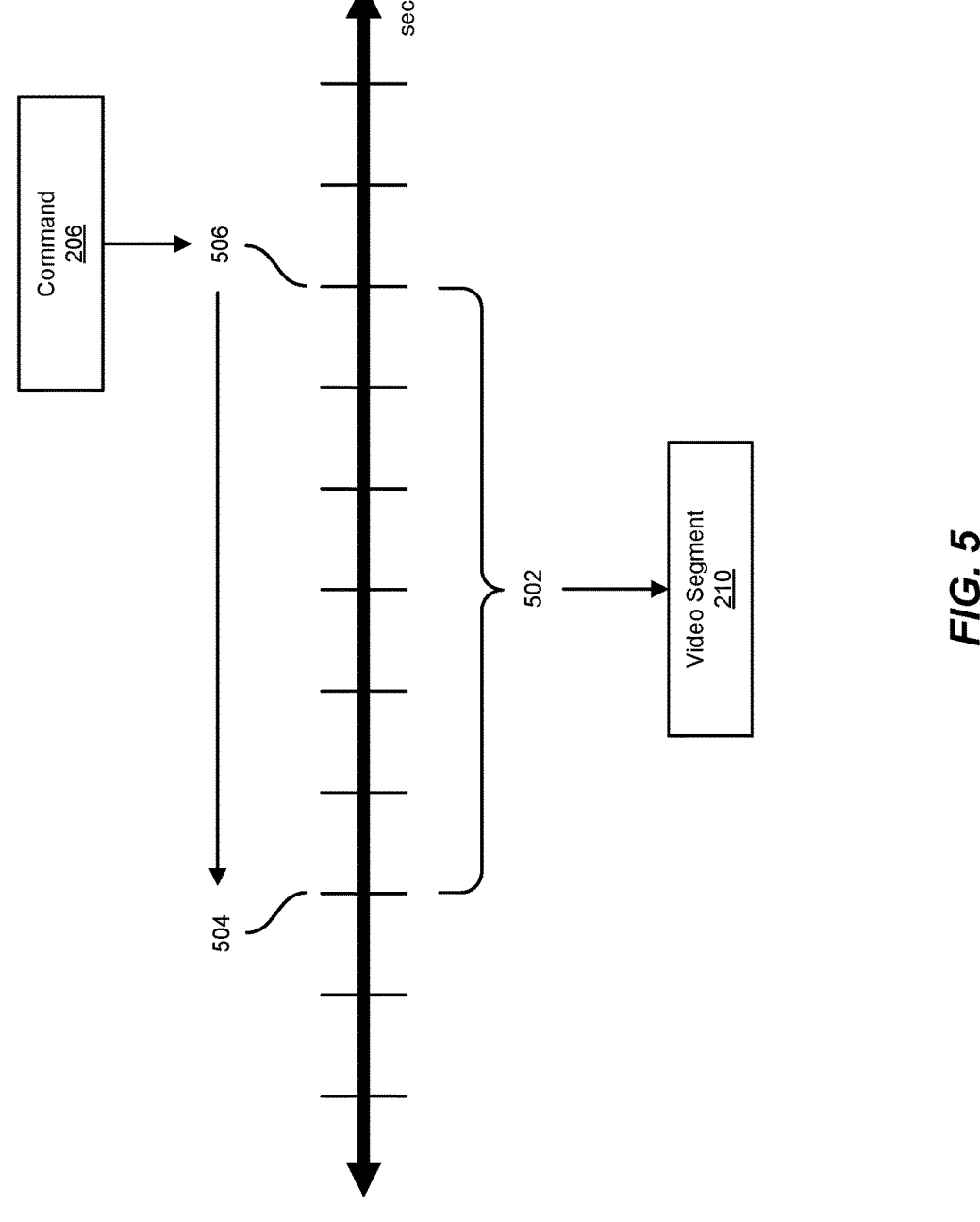
FIG. 5 is an illustration of an exemplary timeline of an exemplary video stream.

As illustrated in FIG. 5, video stream 208 may represent a continuous timeline. In this example, command 206 may be detected at a timestamp 506. In this example, extraction module 214 may then determine a time 504 to begin clipping video segment 210 based on a preset clip length 502, extending back in time from timestamp 506. In this example, extraction module 214 may then clip video segment 210 from time 504 until timestamp 506, thus capturing the most recent events during video stream 208. In some examples, computing device 202(1) may continue to monitor video stream 208 and retain previous portions of video for an amount of time, such as preset clip length 502, such that extraction module 214 can extract video segment 210 without needing to record the entirety of video stream 208.

Returning to FIG. 1, at step 130, one or more of the systems described herein may automatically identify, by the computing device, one or more points of interest in the video segment. For example, an identification module 216 may, as part of computing device 202(1) of FIGS. 2-3, automatically identify a point of interest 222 in video segment 210.

The systems described herein may perform step 130 in a variety of ways. In some embodiments, identification module 216 may automatically identify point of interest 222 by using a machine-learning model to detect a focal subject of video stream 208 and/or a face of a user. For example, based on previous short-form videos that a user of computing device 202(1) and/or other users have created, the machine-learning model may determine that certain types of images are likely to be a point of interest for users. Additionally or alternatively, a user may define what elements of a video may be considered points of interest, and identification module 216 may use the definitions to identify point of interest 222. In some examples, a face of a user may include a facecam detected as part of video stream 208. In some examples, a focal subject of video stream 208 may include a visual element that a user may want to share or highlight.

Figure 6:
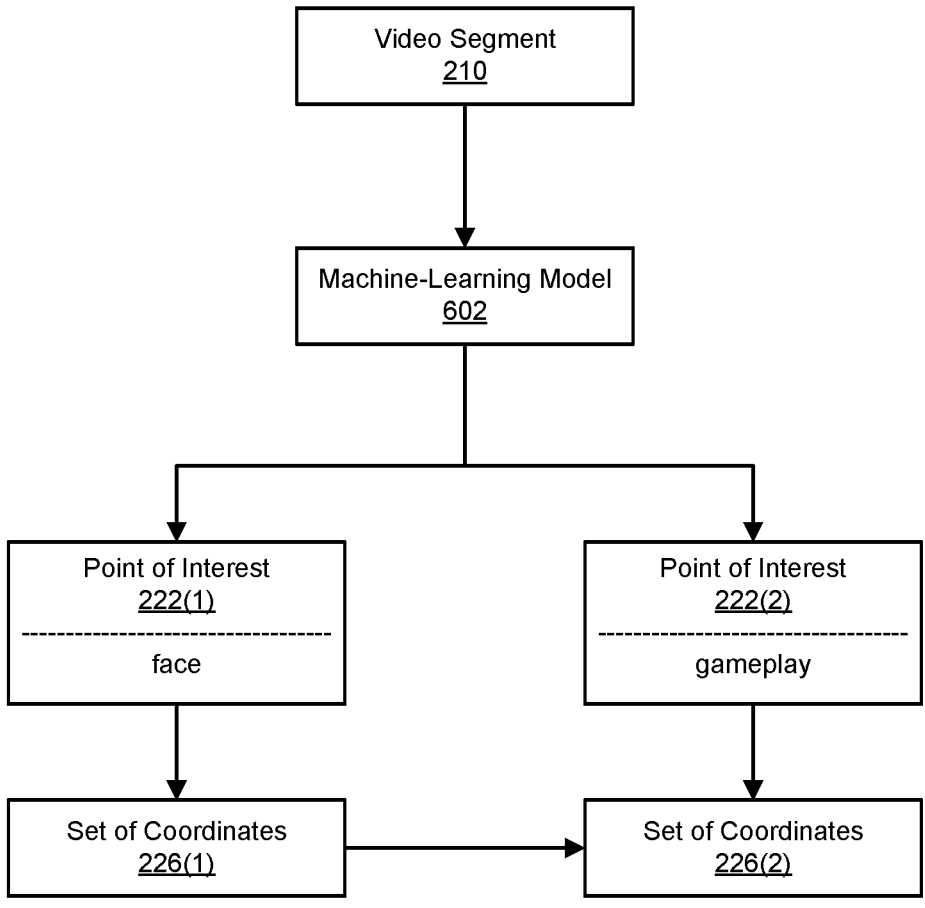
FIG. 6 is a block diagram of an exemplary machine-learning model for identifying exemplary points of interest and sets of coordinates.

As shown in the example of FIG. 6, video segment 210 may be input to a machine-learning model 602. In this example, machine-learning model 602 may separately identify points of interest 222(1)-(2). For example, machine-learning model 602 may be trained to identify a human face and/or a facial expression. Additionally or alternatively, machine-learning model 602 may be trained using other shared videos and/or user reactions, such as comments or emojis, that may indicate viewer engagement with videos.

Figure 7:
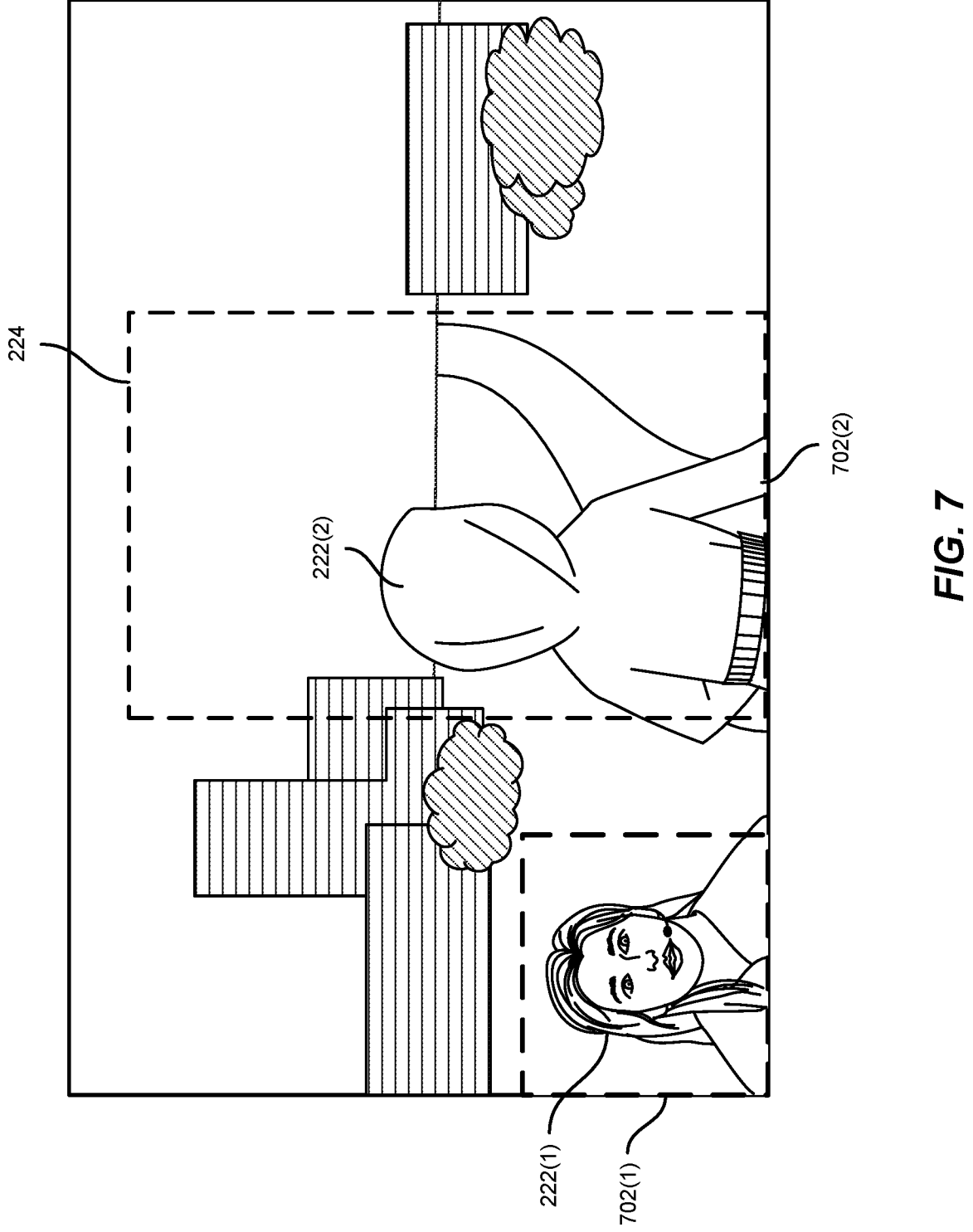
FIG. 7 is an illustration of an exemplary cropping of exemplary points of interest.

As illustrated in FIG. 7, point of interest 222(1) may include a face of a user, and point of interest 222(2) may include an interesting gameplay element, such as a user avatar and a direction the user avatar is moving. In this example, the face of the user may be included as a view of a facecam visible in a portion of video stream 208. In some examples, machine-learning model 602 may detect the face of the user after tracking video stream 208 for a period of time to increase the confidence of the results. In these examples, a facecam may be tracked prior to clipping video segment 210 to improve the accuracy of face detection by using prior video data. Similarly, machine-learning model 602 may improve detection of the focal subject using video data prior to video segment 210.

In other examples, a facecam may be part of a separate stream or part of viewer reactions. For example, identification module 216 may identify point of interest 222(2) in video segment 210 and may identify a separate facecam of a viewer of video stream 208 as point of interest 222(1). In some examples, a user broadcasting video stream 208 and/or a user viewing video stream 208 may be requested to consent to recording of the facecam, although a short-form video may be generated with only a focal subject and without the facecam as a point of interest.

Returning to FIG. 1, at step 140, one or more of the systems described herein may determine, by the computing device, one or more sets of coordinates to crop the video segment based on a predetermined aspect ratio and the one or more points of interest. For example, a determination module 218 may, as part of computing device 202(1) of FIGS. 2-3, determine a set of coordinates 226 to crop video segment 210 based on a predetermined aspect ratio 224 and point of interest 222.

The systems described herein may perform step 140 in a variety of ways. In some examples, the term "coordinate" may refer to a pixel location within an image, such as the X and Y coordinates of a pixel within a frame of a video. In some examples, the term "aspect ratio" may refer to the proportional ratio of a width of an image to a height of the image. For example, a 16:9 frame of a video has 16 units of width for every 9 units of length, making it a horizontal, landscape format. Video games, movies, and other forms of media may often be formatted in landscape ratios. In contrast, mobile devices may often be held and viewed in portrait format, such as a 9:16 aspect ratio.

In one embodiment, determination module 218 may determine set of coordinates 226 to crop video segment 210 by determining a position of the face of the user using a face-tracking model and/or determining a position of the focal subject based on the position of the face. In this embodiment, machine-learning model 602 of FIG. 6 may include a face-tracking model or expression-tracking model to detect faces. In this embodiment, determination module 218 may then intelligently predict the position of the focal subject after detecting the face. For example, as illustrated in FIG. 7, determination module 218 may determine point of interest 222(1) of a user's face may be positioned in a bottom left corner of the frame. In this example, determination module 218 may deduce that point of interest 222(2) containing the focal subject may be to the right of point of interest 222(1).

Additionally or alternatively, determination module 218 may determine set of coordinates 226 using machine-learning model 602 to determine the position of the focal subject. In the example of FIG. 6, determination module 218 may identify a set of coordinates 226(1) for point of interest 222(1) and a set of coordinates 226(2) for point of interest 222(2) when machine-learning model 602 initially detects points of interest 222(1)-(2).

In the example of FIG. 7, determination module 218 may determine set of coordinates 226(1) for point of interest 222(1) as a box around point of interest 222(1). Similarly, determination module 218 may determine set of coordinates 226(2) for point of interest 222(2) as a separate box. In some examples, set of coordinates 226(1) may overlap with set of coordinates 226(2) and may contain some of the same pixels.

Returning to FIG. 1, at step 150, one or more of the systems described herein may create, by the computing device, a short-form video by cropping and reformatting the video segment based on the one or more sets of coordinates. For example, a creation module 220 may, as part of computing device 202(1) of FIGS. 2-3, create a short-form video 228 by cropping and reformatting video segment 210 based on set of coordinates 226.

The systems described herein may perform step 150 in a variety of ways. In some examples, the term "short-form video" may refer to any video limited to a length of time in comparison to a long-form video or video streaming. In one embodiment, creation module 220 may create short-form video 228 by cropping video segment 210 based on predetermined aspect ratio 224 and/or set of coordinates 226. In some embodiments, creation module 220 may create short-form video 228 based on set of coordinates 226(1) of point of interest 222(1) of FIG. 6, set of coordinates 226(2) of point of interest 222(2), and or any other sets of coordinates of other points of interests. In these embodiments, creation module 220 may overlay a cropped video segment of point of interest 222(1) over a portion of a cropped video segment of point of interest 222(2).

Figure 8:
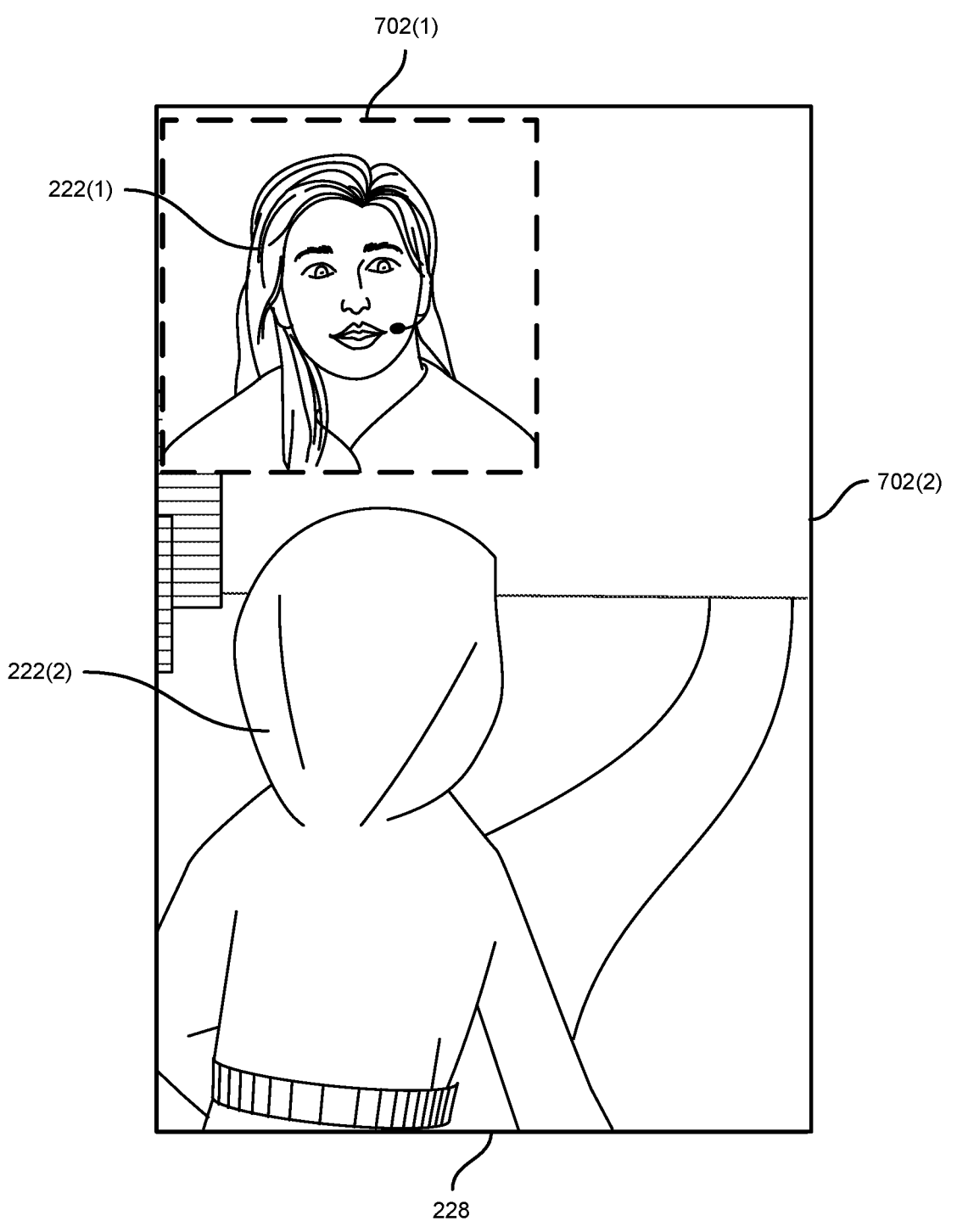
FIG. 8 is an illustration of an exemplary overlay for an exemplary reformatted video segment.

In the example of FIG. 7, creation module 220 may create a cropped video segment 702(1) of point of interest 222(1) and a cropped video segment 702(2) of point of interest 222(2). In this example, cropped video segment 702(2) may adhere to predetermined aspect ratio 224 while cropped video segment 702(1) may not. As illustrated in FIG. 8, cropped video segment 702(2) may form the basis for short-form video 228 with predetermined aspect ratio 224, and creation module 220 may then overlap cropped video segment 702(1) over a corner of cropped video segment 702(2) to complete short-form video 228.

In some embodiments, overlaying cropped video segment 702(1) over the portion of cropped video segment 702(2) may include adjusting a size of cropped video segment 702(1) and/or adjusting a position of cropped video segment 702(1). Additionally or alternatively, overlaying cropped video segment 702(1) over the portion of cropped video segment 702(2) may include adjusting cropped video segment 702(1) based on a position of point of interest 222(2) in cropped video segment 702(2) and/or a priority of point of interest 222(1) relative to a priority of point of interest 222(2). In other embodiments, one or more additional points of interest may be detected, and the overlap of each point of interest may depend on the relative priorities of the points of interest.

Figure 9:
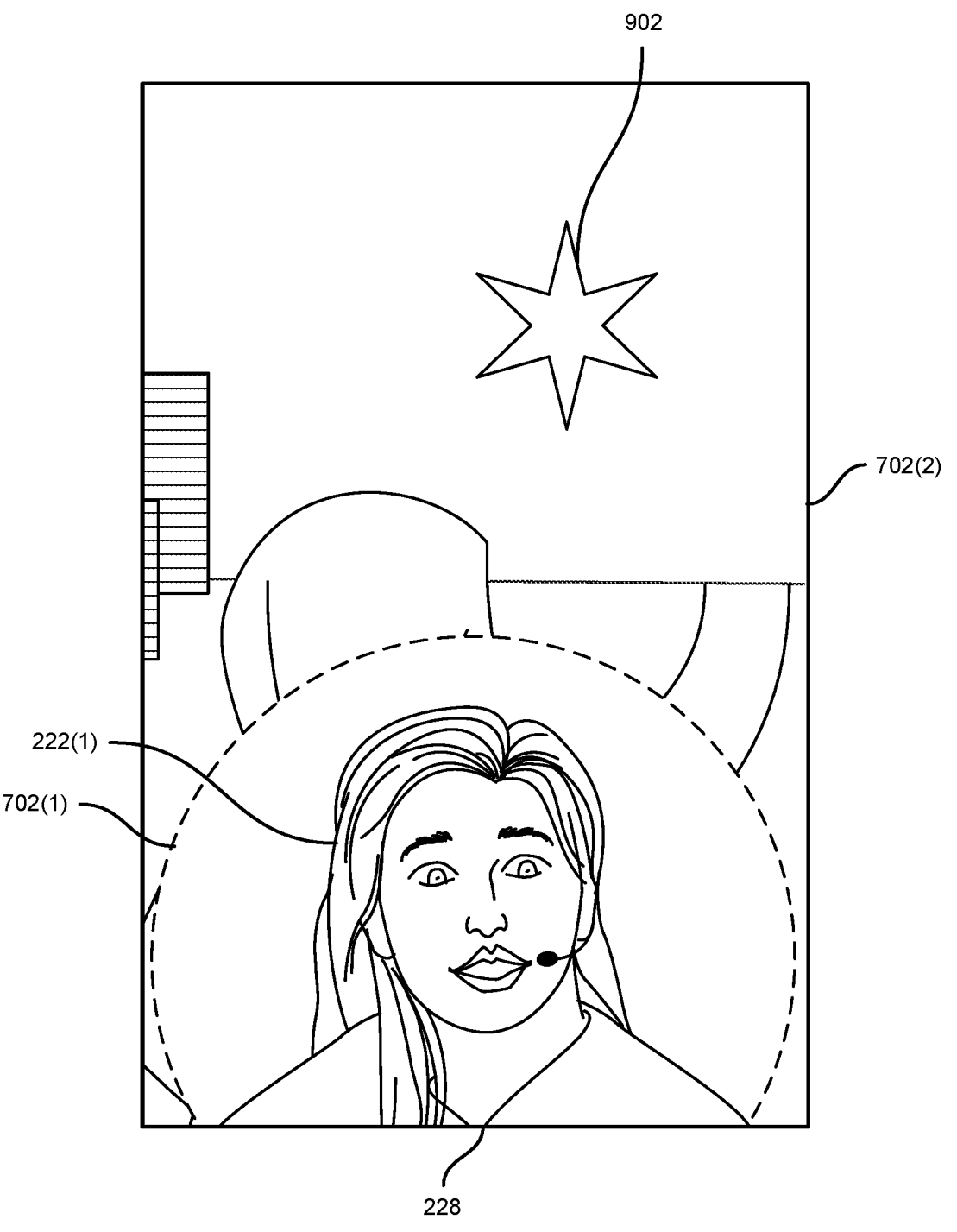
FIG. 9 is an illustration of an additional exemplary overlay and reformatting for the exemplary video segment.

In the example of FIG. 8, computing device 202(1) may determine point of interest 222(2) is of higher priority than point of interest 222(1) at a particular moment of short-form video 228. In this example, cropped video segment 702(1) may be adjusted to a smaller size and positioned in a corner of short-form video 228 to avoid blocking point of interest 222(2). In contrast, as illustrated in FIG. 9, point of interest 222(1) may represent an important user reaction or expression, and cropped video segment 702(1) may be adjusted larger and positioned more prominently to highlight the importance of point of interest 222(1) in short-form video 228. In this example, computing device 202(1) may track an expression of the user's face and weight detected facial expressions, such as by using face-tracking or expression-tracking models, to determine the priority of point of interest 222(1). Additionally, as described above, machine-learning model 602 may detect facial expressions to determine when an interest event occurs and automate clipping to create short-form video 228. Furthermore, overlaid cropped video segment 702(1) may represent a different size or shape or may include a different border or boundary than originally detected set of coordinates 226(1). In some examples, overlaid cropped video segment 702(1) may include a visible border. In other examples, overlaid cropped video segment 702(1) may not include visible borders, such as by using digital image masking to create a cutout in the shape of the user's head.

In some embodiments, creation module 220 may create short-form video 228 by reformatting video segment 210 to predetermined aspect ratio 224 and by formatting video segment 210 to a predetermined file type. In some examples, the terms "formatting" and "reformatting" may refer to processes to ensure a file is in compliance with a specific file format, file type, file size, and/or any other file or data attribute. For example, short-form video 228 may be limited in the potential file types acceptable for sharing on an online platform. In some examples, creation module 220 may use set of coordinates 226(2) to reformat video segment 210 to fit predetermined aspect ratio 224. For example, creation module 220 may use a 9:16 aspect ratio for cropped video segment 702(2) to create short-form video 228 in the 9:16 aspect ratio.

In some embodiments, the disclosed systems and methods may further include automatically identifying a change in point of interest 222, determining one or more new sets of coordinates to crop video segment 210 based on the change, and re-cropping video segment 210 based on the one or more new sets of coordinates. In the example of FIG. 9, computing device 202(1) may detect a change 902, such as by using machine-learning model 602, as a new visual element of video segment 210. In this example, change 902 may occur partway through video segment 210 and not may not exist at the beginning of the clip. In this example, computing device 202(1) may then determine the coordinates for change 902 and adjust the cropping and positioning of cropped video segments 702(1)-(2) accordingly. For example, if the focal point of video segment 210 moves around a screen, computing device 202(1) may crop each frame of video segment 210 to follow the moving focal point.

In the examples of FIGS. 8-9, FIG. 9 may represent a frame of video occurring after a frame shown in FIG. 8. In this example, change 902 may also include a change to point of interest 222(1). For example, computing device 202(1) may determine a tracked expression of point of interest 222(1) changes and increases the priority of point of interest 222(1). In this example, the different expression of point of interest 222(1) in FIG. 9 may represent a reaction of the user in seeing change 902, and computing device 202(1) may alter the size and placement of cropped video segment 702(1) to highlight the user's reaction. In other examples, the disclosed systems and methods may include zooming in on the user's face, capturing the face for a highlighted view of the expression, and/or other methods to prioritize or deprioritize point of interest 222(1) based on the events in video segment 210.

In some examples, the disclosed systems and methods may further include transmitting short-form video 228 over a network, such as network 204 of FIG. 2. In these examples, computing device 202(1) may initially save short-form video 228 to a library or database. In these examples, a user of computing device 202(1) may select a retention period for short-form video 228. In these examples, the user may review short-form video 228 after finishing a livestreaming session and prior to sharing short-form video 228 over network 204. In some examples, the user may further edit short-form video 228 before sharing, such as by trimming the length or editing the cropping of points of interest. Additionally or alternatively, short-form video 228 may be created and shared during video stream 208. For example, the user may opt in to automatically posting short-form video 228 as soon as it is created. In this example, computing device 202(1) may entirely automate the process of determining when to clip a video, creating reformatted short-form video 228, and posting short-form video 228. In this example, the user may retroactively remove or delete short-form video 228 rather than manually sharing specific clips. In other examples, the user may give a command, such as a different voice command, during the streaming of video stream 208 to share short-form video 228.

Although described as creating short-form videos from a video stream, the disclosed systems and methods may perform similar reformatting for other forms of media content, including downloaded video files. The disclosed systems and methods also enable viewers to share short-form videos created from a video stream with the creator of the video streams, enabling both creators and viewers to clip and share short-form videos.

As explained above in connection with method 100 in FIG. 1, the disclosed systems and methods may, by automating the detection of points of interest in a video, such as through machine-learning models, reformat videos to maintain the points of interest in a target format, such as a new aspect ratio. Specifically, the disclosed systems and methods may first detect a command to clip a portion of a video stream. The machine-learning models may automatically detect the presence of a facecam in a video frame. The disclosed systems and methods may then make mathematical inferences about focal subjects of videos, such as interesting parts of gameplay. The machine-learning model may also directly predict focal subjects using trained video data. Furthermore, the machine-learning model may automatically identify a need to clip a video. The disclosed systems and methods may then identify the position and coordinates of these points of interest and crop them from the video segment. The cropping of points of interest may also adhere to a target format or aspect ratio. Additionally, the systems and methods described herein may overlay one or more points of interest over another, such as by overlaying a facecam video over a gameplay video for a streamed gaming session. Thus, the disclosed systems and methods may reformat a video clip without losing important elements of the video. The systems and methods described herein may subsequently enable editing or sharing of the short-form video.

Additionally, the disclosed systems and methods enable the use of a voice command to create the shortened video clip. For example, during a gaming session, a user may decide to share a recent series of actions and vocally command the disclosed systems to create the shortened video clip without ending the session. The shortened video clip may also be automatically shared online as a highlight of the gaming session. By enabling users to easily command the clipping of a streaming video, the disclosed systems and methods may enable users to focus on the shared video content and may provide hands-free control. By automating the process of reformatting and creating short-form videos, the disclosed systems and methods may reduce the need for additional costly software and editing processes. Thus, the systems and methods described herein may improve over traditional computing systems by creating an automated process that reformats and creates a short-form video that highlights specific video elements for more interesting or engaging multimedia content.

Example 1: A computer-implemented method for automating video reformatting may include 1) detecting, by a computing device, a command to clip a video segment from a video stream, 2) extracting, by the computing device, the video segment from the video stream based on the command, 3) automatically identifying, by the computing device, one or more points of interest in the video segment, 4) determining, by the computing device, one or more sets of coordinates to crop the video segment based on a predetermined aspect ratio and the one or more points of interest, and 5) creating, by the computing device, a short-form video by cropping and reformatting the video segment based on the one or more sets of coordinates.

Example 2: The computer-implemented method of Example 1, wherein the video stream may include a video broadcast by the computing device to one or more other computing devices and/or a video received by the computing device from the one or more other computing devices.

Example 3: The computer-implemented method of any of Examples 1 and 2, wherein detecting the command to clip the video segment from the video stream may include predicting the command to clip the video segment based on a machine-learning analysis of the video stream and/or detecting a user command.

Example 4: The computer-implemented method of Example 3, wherein detecting the user command may include detecting a voice command by a user and using natural language processing to extract the command from the voice command.

Example 5: The computer-implemented method of any of Examples 1-4, wherein extracting the video segment from the video stream may include extracting a preset clip length of the video stream from a time prior to a timestamp of the command to the timestamp of the command.

Example 6: The computer-implemented method of any of Examples 1-5, wherein automatically identifying the one or more points of interest may include using a machine-learning model to detect a focal subject of the video stream and/or a face of a user.

Example 7: The computer-implemented method of Example 6, wherein determining the one or more sets of coordinates to crop the video segment may include determining a position of the face of the user using a face-tracking model, determining a position of the focal subject based on the position of the face, and/or using the machine-learning model to determine the position of the focal subject.

Example 8: The computer-implemented method of any of Examples 1-7, wherein creating the short-form video may include 1) cropping the video segment based on the predetermined aspect ratio, a set of coordinates of a first point of interest, and/or a set of coordinates of a second point of interest, and/or 2) overlaying a cropped video segment of the first point of interest over a portion of a cropped video segment of the second point of interest.

Example 9: The computer-implemented method of Example 8, wherein overlaying the cropped video segment of the first point of interest over the portion of the cropped video segment of the second point of interest may include adjusting a size of the cropped video segment of the first point of interest and/or adjusting a position of the cropped video segment of the first point of interest.

Example 10: The computer-implemented method of any of Examples 8 and 9, wherein overlaying the cropped video segment of the first point of interest over the portion of the cropped video segment of the second point of interest may include adjusting the cropped video segment of the first point of interest based on a position of the second point of interest in the cropped video segment of the second point of interest and/or a priority of the first point of interest relative to a priority of the second point of interest.

Example 11: The computer-implemented method of any of Examples 1-10, wherein creating the short-form video may include reformatting the video segment to the predetermined aspect ratio and formatting the video segment to a predetermined file type.

Example 12: The computer-implemented method of any of Examples 1-11 may further include automatically identifying a change in the one or more points of interest, determining one or more new sets of coordinates to crop the video segment based on the change, and re-cropping the video segment based on the one or more new sets of coordinates.

Example 13: The computer-implemented method of any of Examples 1-12 may further include transmitting the short-form video over a network.

Example 14: A corresponding system for automating video reformatting may include several modules store in memory, including 1) a detection module that detects a command to clip a video segment from a video stream, 2) an extraction module that extracts the video segment from the video stream based on the command, 3) an identification module that automatically identifies one or more points of interest in the video segment, 4) a determination module that determines one or more sets of coordinates to crop the video segment based on a predetermined aspect ratio and the one or more points of interest, and 5) a creation module that creates a short-form video by cropping and reformatting the video segment based on the one or more sets of coordinates. The system may also include one or more hardware processors that execute the detection module, the extraction module, the identification module, the determination module, and the creation module.

Example 15: The system of Example 14, wherein the detection module may detect the command to clip the video segment from the video stream by predicting the command to clip the video segment based on a machine-learning analysis of the video stream and/or by detecting a user command.

Example 16: The system of Example 15, wherein detecting the user command may include detecting a voice command by a user and using natural language processing to extract the command from the voice command.

Example 17: The system of any of Examples 14-16, wherein the identification module may automatically identify the one or more points of interest by using a machine-learning model to detect a focal subject of the video stream and/or a face of a user.

Example 18: The system of Example 17, wherein the determination module may determine the one or more sets of coordinates to crop the video segment by determining a position of the face of the user using a face-tracking model, determining a position of the focal subject based on the position of the face, and/or using the machine-learning model to determine the position of the focal subject.

Example 19: The system of any of Examples 14-18, wherein the creation module may create the short-form video by 1) cropping the video segment based on the predetermined aspect ratio, a set of coordinates of a first point of interest and/or a set of coordinates of a second point of interest, and/or 2) overlaying a cropped video segment of the first point of interest over a portion of a cropped video segment of the second point of interest.

Example 20: The above-described method may be encoded as computer-readable instructions on a computer-readable medium. For example, a non-transitory computer-readable medium may include one or more computer-executable instructions that, when executed by one or more processors of a computing device, may cause the computing device to 1) detect a command to clip a video segment from a video stream, 2) extract the video segment from the video stream based on the command, 3) automatically identify one or more points of interest in the video segment, 4) determine one or more sets of coordinates to crop the video segment based on a predetermined aspect ratio and the one or more points of interest, and 5) create a short-form video by cropping and reformatting the video segment based on the one or more sets of coordinates.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive a video stream to be transformed, transform the video stream into a video segment, output a result of the transformation to identify a point of interest, use the result of the transformation to determine a set of coordinates of the point of interest, and store the result of the transformation to create a reformatted short-form video. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting, by a computing device, a command to clip a video segment from a video stream;
   extracting, by the computing device, the video segment from the video stream based on the command;

automatically identifying, by the computing device, at least one point of interest in the video segment;

determining, by the computing device, at least one set of coordinates to crop the video segment based on a predetermined aspect ratio and the at least one point of interest; and creating, by the computing device, a short-form video by cropping and reformatting the video segment based on the at least one set of coordinates, wherein creating comprises (i) overlaying a cropped video segment of the at least one point of interest over a portion of a cropped video segment of a second point of interest, and at least one of (ii) adjusting a size of the cropped video segment of the at least one point of interest, or adjusting a position of the cropped video segment of the at least one point of interest.

2. The method of claim 1, wherein the video stream comprises at least one of:

a video broadcast by the computing device to at least one other computing device; or a video received by the computing device from the at least one other computing device.

3. The method of claim 1, wherein detecting the command to clip the video segment from the video stream comprises:

predicting the command to clip the video segment based on a machine-learning analysis of the video stream; or detecting a user command.

4. The method of claim 3, wherein detecting the user command comprises:

detecting a voice command by a user; and using natural language processing to extract the command from the voice command.

5. The method of claim 1, wherein extracting the video segment from the video stream comprises extracting a preset clip length of the video stream from a time prior to a timestamp of the command to the timestamp of the command.

6. The method of claim 1, wherein automatically identifying the at least one point of interest comprises using a machine-learning model to detect at least one of:

a focal subject of the video stream; or a face of a user.

7. The method of claim 6, wherein determining the at least one set of coordinates to crop the video segment comprises at least one of:

determining a position of the face of the user using a face-tracking model;

determining a position of the focal subject based on the position of the face; or using the machine-learning model to determine the position of the focal subject.

8. The method of claim 1, wherein creating the short-form video comprises at least one of:

cropping the video segment based on at least one of:

the predetermined aspect ratio;

a set of coordinates of a first point of interest; or a set of coordinates of a second point of interest.

9. The method of claim 1, wherein overlaying the cropped video segment of the first point of interest over the portion of the cropped video segment of the second point of interest comprises adjusting the cropped video segment of the first point of interest based on at least one of:

a position of the second point of interest in the cropped video segment of the second point of interest; or a priority of the first point of interest relative to a priority of the second point of interest.

10. The method of claim 1 wherein creating the short-form video comprises:

reformatting the video segment to the predetermined aspect ratio; and formatting the video segment to a predetermined file type.

11. The method of claim 1, further comprising:

automatically identifying a change in the at least one point of interest;

determining at least one new set of coordinates to crop the video segment based on the change; and re-cropping the video segment based on the at least one new set of coordinates.

12. The method of claim 1, further comprising transmitting the short-form video over a network.

13. A system comprising:

a detection module, stored in memory, that detects a command to clip a video segment from a video stream;

an extraction module, stored in memory, that extracts the video segment from the video stream based on the command;

an identification module, stored in memory, that automatically identifies at least one point of interest in the video segment;

a determination module, stored in memory, that determines at least one set of coordinates to crop the video segment based on a predetermined aspect ratio and the at least one point of interest;

a creation module, stored in memory, that creates a short-form video by cropping and reformatting the video segment based on the at least one set of coordinates, wherein creating comprises (i) overlaying a cropped video segment of the at least one point of interest over a portion of a cropped video segment of a second point of interest, and at least one of (ii) adjusting a size of the cropped video segment of the at least one point of interest, or adjusting a position of the cropped video segment of the at least one point of interest; and at least one processor that executes the detection module, the extraction module, the identification module, the determination module, and the creation module.

14. The system of claim 13, wherein the detection module detects the command to clip the video segment from the video stream by:

predicting the command to clip the video segment based on a machine-learning analysis of the video stream; or detecting a user command.

15. The system of claim 14, wherein detecting the user command comprises:

detecting a voice command by a user; and using natural language processing to extract the command from the voice command.

16. The system of claim 13, wherein the identification module automatically identifies the at least one point of interest by using a machine-learning model to detect at least one of:

a focal subject of the video stream; or a face of a user.

17. The system of claim 16, wherein the determination module determines the at least one set of coordinates to crop the video segment by at least one of:

determining a position of the face of the user using a face-tracking model;

determining a position of the focal subject based on the position of the face; or using the machine-learning model to determine the position of the focal subject.

18. The system of claim 13, wherein the creation module creates the short-form video by at least one of:

cropping the video segment based on at least one of:

the predetermined aspect ratio;

a set of coordinates of a first point of interest; or a set of coordinates of a second point of interest.

19. A non-transitory computer-readable medium comprising one or more computer-executable instructions that, when executed by at least one processor of a computing device, cause the computing device to:

detect, by the computing device, a command to clip a video segment from a video stream;

extract, by the computing device, the video segment from the video stream based on the command;

automatically identify, by the computing device, at least one point of interest in the video segment;

determine, by the computing device, at least one set of coordinates to crop the video segment based on a predetermined aspect ratio and the at least one point of interest; and create, by the computing device, a short-form video by cropping and reformatting the video segment based on the at least one set of coordinates, wherein creating comprises (i) overlaying a cropped video segment of the at least one point of interest over a portion of a cropped video segment of a second point of interest, and at least one of (ii) adjusting a size of the cropped video segment of the at least one point of interest, or adjusting a position of the cropped video segment of the at least one point of interest.

\* \* \* \* \*